No. 728,957. PATENTED MAY 26, 1903.
J. C. MOORE.
TRUCK.
APPLICATION FILED DEC. 20, 1902.
NO MODEL.
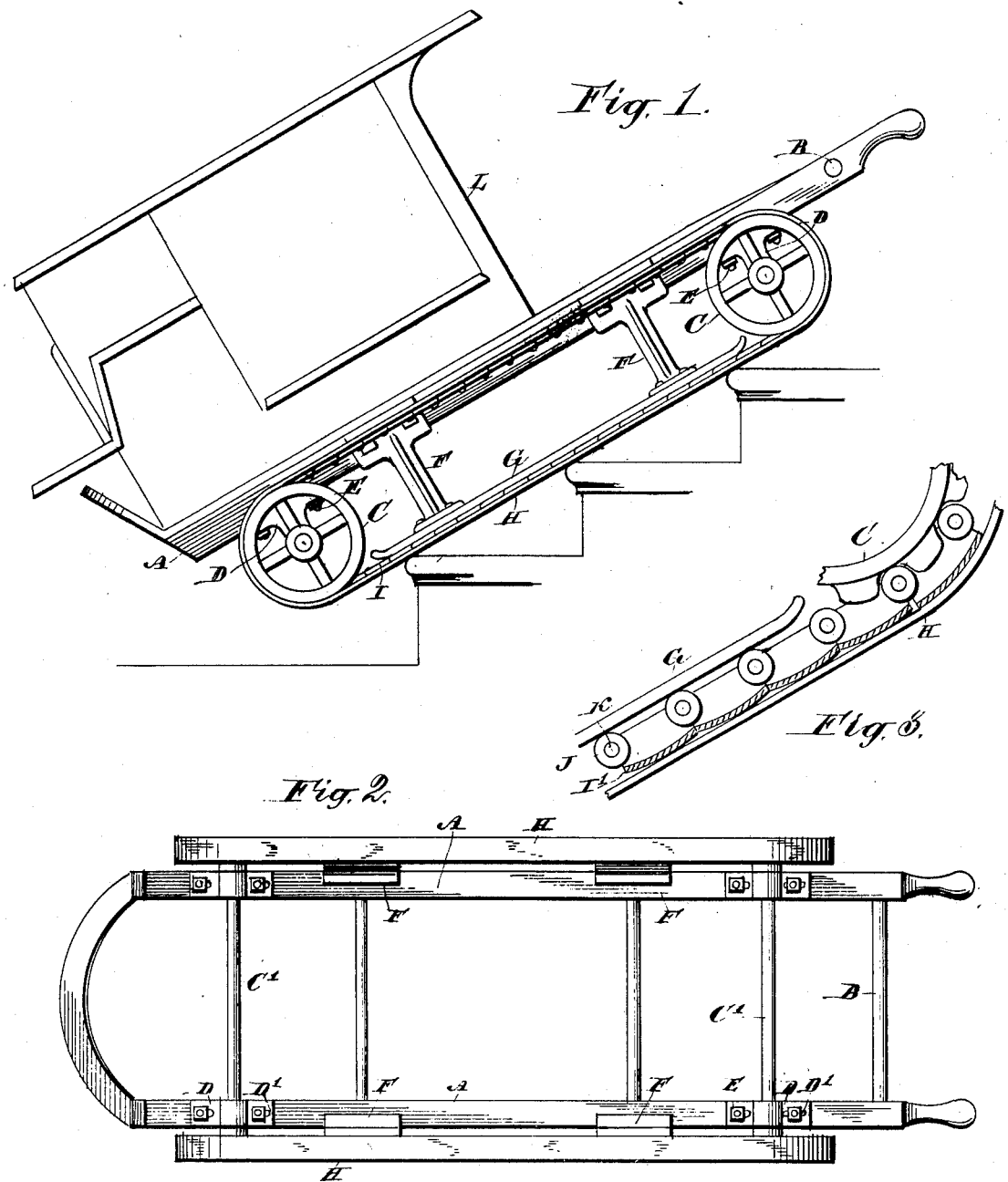
Witnesses:
L. A. St. John
G. J. Kubicek
Inventor
Joseph Calvin Moore
By J. M. St. John
Atty.

No. 728,957. Patented May 26, 1903.

UNITED STATES PATENT OFFICE.

JOSEPH CALVIN MOORE, OF CEDAR RAPIDS, IOWA.

TRUCK.

SPECIFICATION forming part of Letters Patent No. 728,957, dated May 26, 1903.

Application filed December 20, 1902. Serial No. 136,015. (No model.)

*To all whom it may concern:*

Be it known that I, JOSEPH CALVIN MOORE, a citizen of the United States, residing at Cedar Rapids, in the county of Linn and State of Iowa, have invented certain new and useful Improvements in Trucks, of which the following is a specification.

This invention relates to floor-trucks used for the transportation of boxes, barrels, stoves, and other heavy articles; and the object of this invention is to produce a truck adapted for the smooth and easy transfer of such articles up and down stairs. The truck has been designed with more especial reference to the moving of stoves, but may of course be used for many other purposes.

The nature of the invention will be fully apparent from the description and claims following, reference being had to the accompanying drawings, in which—

Figure 1 is a side view of a truck embodying my invention as in use. Fig. 2 is a bottom plan view of the same. Fig. 3 is a fragmentary sectional view of a modified type of link belt. Fig. 4 is a fragmentary section of the type of sprocket-wheel shown in Fig. 1.

In the drawings, A is a truck-frame similar to those in general use. In practice, however, it is preferably provided with a handle-bar B, which enables the operator to hold the truck with one hand and steady the load with the other. To the side bars of the truck are secured bearings D by bolts E near the upper and lower ends, as shown. In these are mounted shafts $C'$, and on the shafts, outside the bearings, are wheels C. The lower pair of wheels serve for transportation over a floor; but all four are employed in moving the truck up and down stairs, as will be explained presently.

The wheels are in the nature of sprocket-wheels, and the pair at each side of the truck is fitted with a chain belt I. Outside of this is another of yielding material, preferably rubber, which admits of the truck being used over carpets or polished woodwork without injury to them. By the slotting of the bolt-holes in the bearings at $D'$ provision is made for taking up any slack in the belt.

Between the wheels, at each side of the truck, is mounted a shoe G by means of hangers F, securely bolted to the truck-frame. The bottom of this shoe, as will be seen, is in line with the top surface of the lower part of the belt. The belt thus slides along the bottom of the shoe as the truck moves up or down stairs, and the shoe gives a straight and unyielding support against the weight of the load. The shoe should be turned up a little at each end, as shown, so as to prevent any catching of the belt.

In practice the truck has been found to operate successfully using sprocket-wheels as made for ordinary link belt. On a floor, however, there is in this case considerable jar as the wheel moves from tooth to tooth, so it is desirable to provide a smooth tread for at least the lower pair of wheels. This may be done in various ways, two of which are illustrated. In the simpler form (illustrated in Figs. 1 and 4) the sprocket-wheel has lateral flanges $C^2$ to carry the outside belt, with central sprocket-teeth $C^3$ to positively drive the link belt. The belt shown in Fig. 3 is designed to reduce friction on the shoe, as well as to secure smoothness in operation. In this the links are connected by pins K, provided with rollers J to run on the shoe G. The sides of the links are connected by a web $I'$, which, on the outer side at least, is curved to an arc of the circle it describes in passing around the sprocket-wheel.

In Fig. 1 the truck is shown in position for moving a cook-stove L up or down stairs. The operation itself is so evident as to call for no description.

Having thus described my invention, what I claim as new, and desire to secure by Letters Patent, is—

1. A truck having a pair of wheels near its upper and lower ends, respectively, link belts connecting the upper and lower wheels at each side, belts of flexible material outside the link belts, and rigid shoes between the upper and lower wheels to bear on the upper surface of the link belts and hold them in line, substantially as and for the purpose set forth.

2. A truck provided with an upper and lower pair of sprocket-wheels at the sides, link belts mounted thereon, continuous belts of yielding material outside thereof, and rigid shoes adapted to bear on the upper surfaces of said link belts at the lower sides, substantially as described.

3. In a truck, the combination with a link belt and a shoe adapted to bear on the upper side of the lower part thereof, of belt-carrying sprocket-wheels near each end of the truck, the floor-wheels being provided with a smooth tread, substantially as described.

4. In a truck having a pair of wheels near each end, one or both pairs serving as carrying-wheels, the combination of rigid shoes between the front and rear wheels, adapted to bear on the upper surface of the lower portion of belt, a link belt mounted on said wheels, the outer faces of the links being curved to the arc of a true circle as they pass around the wheels, and a continuous belt of yielding material outside said link belt to present a smooth surface to the floor, as described.

In testimony whereof I affix my signature in presence of two witnesses.

JOSEPH CALVIN MOORE.

Witnesses:
J. M. ST. JOHN,
W. H. INK.